(12) United States Patent
Whitehouse et al.

(10) Patent No.: US 9,859,705 B2
(45) Date of Patent: Jan. 2, 2018

(54) CURRENT FLOW CONTROLLER

(71) Applicant: ALSTOM Technology Ltd, Baden (CH)

(72) Inventors: Robert Whitehouse, Stafford (GB); Carl David Barker, Staffordshire (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 494 days.

(21) Appl. No.: 14/404,273

(22) PCT Filed: May 31, 2013

(86) PCT No.: PCT/EP2013/061313
§ 371 (c)(1),
(2) Date: Nov. 26, 2014

(87) PCT Pub. No.: WO2013/178807
PCT Pub. Date: Dec. 5, 2013

(65) Prior Publication Data
US 2015/0180231 A1    Jun. 25, 2015

(30) Foreign Application Priority Data
Jun. 1, 2012 (EP) ...................................... 12275084

(51) Int. Cl.
*H02J 1/00* (2006.01)
*H02J 3/36* (2006.01)
(Continued)

(52) U.S. Cl.
CPC ........ *H02J 1/00* (2013.01); *H02J 3/36* (2013.01); *H02J 1/14* (2013.01); *H02J 2001/106* (2013.01); *Y02E 60/60* (2013.01); *Y10T 307/352* (2015.04)

(58) Field of Classification Search
CPC ....................................................... H02J 3/36
See application file for complete search history.

(56) References Cited

U.S. PATENT DOCUMENTS 3,694,728 A    9/1972 Kanngiesser et al.
5,698,969 A    12/1997 Gyugyi
(Continued)

FOREIGN PATENT DOCUMENTS

WO    WO2010115452 A1    10/2010
WO    WO 2011012171 A1 *   2/2011  ............ H02J 3/1857
(Continued)

OTHER PUBLICATIONS

International Search Report and Written Opinion for PCT Application No. PCT/EP2013/061313, dated Nov. 4, 2013, 10 pages.
(Continued)

*Primary Examiner* — Rexford Barnie
*Assistant Examiner* — David Shiao
(74) *Attorney, Agent, or Firm* — GE Global Patent Operation; Scott R. Stanley

(57) ABSTRACT

A current flow controller (10) comprising: a plurality of terminals (12a, 12b, 14a, 14b) for connection, in use, to a plurality of DC power transmission medium (16,18) such that each DC power transmission medium (16,18) is connected to at least one of the plurality of terminals (12a, 12b, 14a, 14b); and a current flow control unit interconnecting the plurality of terminals (12a, 12b, 14a, 14b), the current flow control unit including a plurality of current flow control sub-units (20, 22, 23) each of which is, in use, connected to a respective DC power transmission medium (16, 18), each current flow control sub-unit (20, 22, 23) including at least one switching element (24, 28), the or each switching element (24, 28) of each current flow control sub-unit (20, 22, 23) being connected to the same energy storage device (26; 56) to selectively provide a voltage source, and a switching control unit (100) to control switching of each switching element (24, 28) of the current flow control unit to selectively inject a voltage drop ($V_1$, $V_2$), in use, into each
(Continued)

DC power transmission medium (16,18) so as to simultaneously regulate current flow ($I_1$, $I_2$) in each DC power transmission medium (16, 18) and divert energy from at least one DC power transmission medium (16, 18) into at least one other DC power transmission medium (16, 18) via the current flow control unit.

14 Claims, 4 Drawing Sheets

(51) Int. Cl.
*H02J 1/14* (2006.01)
*H02J 1/10* (2006.01)

(56) References Cited

U.S. PATENT DOCUMENTS

| | | | |
|---|---|---|---|
| 9,065,328 B2* | 6/2015 | Papastergiou | H02J 1/102 |
| 2009/0224729 A1 | 9/2009 | Li et al. | |
| 2013/0200849 A1* | 8/2013 | Crebier | H01M 10/441 |
| | | | 320/116 |
| 2014/0160812 A1* | 6/2014 | Norrga | H02M 3/07 |
| | | | 363/44 |

FOREIGN PATENT DOCUMENTS

| | | | | |
|---|---|---|---|---|
| WO | WO 2011124258 A1 * | 10/2011 | | H02J 3/36 |
| WO | WO 2011127980 A1 * | 10/2011 | | H02J 3/36 |
| WO | WO 2011128849 A2 * | 10/2011 | | H01M 10/441 |
| WO | WO2012037966 A1 | 3/2012 | | |
| WO | WO2012037967 A1 | 3/2012 | | |

OTHER PUBLICATIONS

C D Barker et. al., 01CA Current Flow Controller for Use in HVDC Grids01D, ACDC 2012, Birmingham, 2012, 5 pages.

* cited by examiner

CURRENT FLOW CONTROLLER

CROSS REFERENCE TO RELATED APPLICATIONS

The present application is a National Stage of International Application No. PCT/EP2013/061313, filed May 31, 2013, which claims priority to European Application No. 12275084.7, filed Jun. 1, 2012, which is incorporated herein by reference in its entirety.

This invention relates to a current flow controller and a current flow control circuit.

A DC electrical network may include a power source, such as a battery, that is connected to a load via one or more current-carrying conductors, or multiple power sources that are connected to multiple loads using a network of current-carrying conductors.

An example of a DC electrical network is a DC power grid that requires multi-terminal interconnection of HVDC converters, whereby power can be exchanged on the DC side using two or more HVDC converters electrically connected together. Each HVDC converter acts as either a source or sink to maintain the overall input-to-output power balance of the DC power grid whilst exchanging the power as required. The DC power grid relies on a network of DC power transmission lines or cables to achieve multi-terminal interconnection of the HVDC converters.

According to a first aspect of the invention, there is provided a current flow controller comprising:
- a plurality of terminals for connection, in use, to a plurality of DC power transmission media such that each DC power transmission medium is connected to at least one of the plurality of terminals; and
- a current flow control unit interconnecting the plurality of terminals, the current flow control unit including a plurality of current flow control sub-units each of which is, in use, connected to a respective DC power transmission medium, each current flow control sub-unit including at least one switching element, the or each switching element of each current flow control sub-unit being connected to the same energy storage device to selectively provide a voltage source; and
- a switching control unit to control switching of each switching element of the current flow control unit to selectively inject a voltage drop, in use, into each DC power transmission medium so as to simultaneously regulate current flow in each DC power transmission medium and divert energy from at least one DC power transmission medium into at least one other DC power transmission medium via the current flow control unit.

A DC power transmission medium may be any medium that is capable of transmitting electrical power between two or more electrical elements. Such a medium may be, but is not limited to, a submarine DC power transmission cable, an overhead DC power transmission line or cable and an underground DC power transmission cable. Such an electrical element may be, but is not limited to, a DC power source, a load, a DC terminal of a DC power grid, or a DC electrical network.

In use, each DC power transmission medium may be connected to the current flow controller via a single terminal or multiple terminals.

During transmission of power through the plurality of DC power transmission media, one DC power transmission medium may carry a higher current than at least one other DC power transmission medium due to, for example, a variation in conductor impedance between the different DC power transmission media.

The inclusion of a voltage source in the current flow control unit permits injection of a voltage drop in each DC power transmission medium. The injection of a voltage drop into a DC power transmission medium creates either a positive resistance effect in which the voltage drop opposes and thereby reduces the current flow in that DC power transmission medium, or a negative resistance effect in which the voltage drop contributes to an increase of the current flow in that DC power transmission medium.

The interconnection of the plurality of terminals via the current flow control unit permits energy to be transferred between the plurality of DC power transmission media via the current flow control unit. Thus, during regulation of the current flows in the plurality of DC power transmission media as set out above, energy is removed from one DC power transmission medium that is undergoing a reduction in current flow and this energy is diverted, via the current flow control unit, into another DC power transmission medium that is undergoing an increase in current flow.

The inclusion of a plurality of current flow control sub-units in the current flow control unit permits independent control of each current flow control sub-unit to increase or decrease current flow in the corresponding DC power transmission medium, which in turn permits simplification of the control procedure of the current flow controller. This is particularly advantageous when the current flow controller is used in conjunction with a large number of DC power transmission media.

Meanwhile, having all of the current flow control sub-units share the same single energy storage device provides considerable cost, weight and space savings in terms of the resulting current flow controller.

Depending on the topology and/or current flow regulation requirements of the plurality of DC power transmission media, the current flow control unit may be used to divert energy from a single DC power transmission medium to a single other DC power transmission medium, from a single DC power transmission medium to multiple other DC power transmission media, from multiple DC power transmission media to a single other DC power transmission media, or from multiple DC power transmission media to multiple other DC power transmission media.

The current flow control unit may be a unidirectional current flow control unit that is able to divert energy in one direction only between different DC power transmission media. Alternatively the current flow control unit may be a bidirectional current flow control unit that is able to divert energy in both directions between different DC power transmission media. A bidirectional current flow control unit is useful when energy diversion is required in one direction for one set of current flow conditions and in the other direction for another set of current flow conditions.

The current flow control unit may be in constant operation to carry out continuous regulation of the current flows in the plurality of DC power transmission media, or may be operated intermittently to regulate the current flows in the plurality of DC power transmission media.

The current flow controller according to the invention therefore permits dynamic, selective control over current flow in each DC power transmission medium through injection of a voltage drop in each DC power transmission medium. Such control over current flow in each DC power transmission medium is advantageous in that current flow in each DC power transmission medium may be controlled within a specific operating range to improve the power transmission performance of the plurality of DC power transmission media.

The ability to modify the current flows in the plurality of DC power transmission medium through injection of a voltage drop in each DC power transmission medium may be used to regulate the current flows in order to minimise dissipation losses and reduce the risk of each DC power transmission medium exceeding its thermal rating. Preferably regulating current flow in each DC power transmission medium involves balancing the current flows in the plurality of DC power transmission media.

In addition, the use of the current flow controller results in an energy-efficient manner of regulating the current flows in the plurality of DC power transmission media. This is because, as set out above, the diversion of energy during regulation of current flow in each DC power transmission medium involves transferring energy that is removed from one DC power transmission medium to another DC power transmission medium. This thereby obviates the need for additional energy sources to add energy into a DC power transmission medium and the need for additional energy sinks such as storage capacitors or dissipation resistors to store or dissipate energy that is removed from a DC power transmission medium, when increasing or decreasing current flow in each DC power transmission medium. The use of additional energy sources and sinks would add significant cost, size and weight to the plurality of DC power transmission media. Moreover, the use of dissipation resistors would not only increase dissipation losses in the current flow controller, but also might require the use of a cooling system, which would increase the overall complexity of the current flow controller.

Furthermore, the use of the current flow controller in regulating current flow in each DC power transmission medium may be carried out independently of the operation of the electrical elements at either end of each DC power transmission medium. This removes the need to redesign the control procedure for the electrical elements in order to accommodate a need for regulation of current flow in each DC power transmission medium.

To further improve the efficiency of the current flow controller, the energy or a sum of the energies diverted by the current flow control unit from at least one DC power transmission medium is preferably equal to the energy or a sum of the energies diverted by the current flow control unit into at least one other DC power transmission medium.

The voltage drop may be variable. The voltage drop may also be a positive or negative DC voltage drop.

The use of a variable voltage drop permits regulation of current flow in each DC power transmission medium that is undergoing variable current flow conditions.

The current flow control unit may include a plurality of switching elements, which may include, but is not limited to, a plurality of switching elements connected in series, a plurality of switching elements connected in parallel and/or a combination of series-connected and parallel-connected switching elements.

To carry out its current flow regulation duties, the current flow controller may be arranged to have different configurations, some examples of which are as follows.

In embodiments of the invention at least one current flow control sub-unit may conduct current in two directions. This renders the current flow controller compatible for use in circumstances in which the direction of current flow in one or more of the plurality of DC power transmission media is reversed.

At least one current flow control sub-unit may include a plurality of switching elements connected in series.

At least one current flow control sub-unit may include a plurality of switching elements connected in parallel with the energy storage device in a full-bridge arrangement, in order to be able to provide a bidirectional voltage.

Each energy storage device may be, for example, a capacitor, a fuel cell, a battery or any other energy storage device capable of storing and releasing its electrical energy to provide a voltage.

Each switching element may be or may include a semiconductor device that is, for example, an insulated gate bipolar transistor, a gate turn-off thyristor, a field effect transistor, an insulated gate commutated thyristor, an injection-enhanced gate transistor, an integrated gate commutated thyristor, or any other self-commutated semiconductor device connected in series or in parallel.

In other embodiments the plurality of current flow control sub-units may include first and second current flow control sub-units, the first current flow control sub-unit includes a plurality of first switching elements connected in parallel with the energy storage device in a full-bridge arrangement, and the second current flow control sub-unit includes a plurality of second switching elements connected in parallel with the same energy storage device in a full-bridge arrangement.

In other embodiments of the invention, the current flow control unit may further include:
 a first port defining a first terminal for connection, in use, to a first DC power transmission medium;
 a second port defining a second terminal for connection, in use, to a second DC power transmission medium;
 a third port defining a third terminal for connection, in use, to a third DC power transmission medium;
 a first current flow control sub-unit including a pair of first switching elements connected across the energy storage device, a mid-point between the pair of first switching elements being connected to the first port;
 a second current flow control sub-unit including a pair of second switching elements connected across the energy storage device, a mid-point between the pair of second switching elements being connected to the second port; and
 a third current flow sub-unit including a pair of third switching elements connected across the energy storage device, a mid-point between the pair of third switching elements being connected to the third port.

The configuration of the current flow control unit in this manner results in the formation of a tri-port current flow controller.

The modular topology and number of components of the current flow control unit of the tri-port current flow controller may be extended to accommodate one or more additional ports, e.g. a fourth port, a fifth port, etc, to define a multi-port current flow controller. For example, the current flow control unit may be extended to include an additional port defining an additional terminal for connection, in use, to an additional DC power transmission medium, and the current flow control unit may further include a pair of additional switching elements connected across the energy storage device, whereby a mid-point between the pair of additional switching elements is connected to the additional port. The number of ports in such a current flow control unit may vary depending on the number of associated DC power transmission lines and the topology of the associated DC electrical circuit.

The current flow control unit may further include an electrical filter circuit to selectively perform electrical filtering, in use, on the current flow in each DC power transmission medium. The electrical filter circuit may include, but is not limited to, one or more series inductors, one or more shunt capacitors, a plurality of series capacitors and series inductors, and/or one or more resistive elements. The electrical filter circuit may be tuned to one or more harmonic frequencies that is to be minimised.

In use, the switching control unit may switch each switching element to selectively define an electrical filter circuit to perform electrical filtering on the current flow in each DC power transmission medium.

Having the ability to perform electrical filtering on the current flow in each DC power transmission medium permits the removal of unwanted components from the current flow in each DC power transmission medium. Such unwanted components may include, but is not limited to, DC harmonics that arises during operation of the current flow controller to regulate current flow in the plurality of DC power transmission media.

According to a second aspect of the invention, there is provided a current flow control circuit comprising:
a plurality of DC power transmission media for interconnecting a plurality of electrical elements; and
a current flow controller according to any preceding claim,
wherein each DC power transmission medium is connected to at least one of the plurality of terminals of the current flow controller.

The current flow controller and the current flow control circuit according to the invention are applicable to low-voltage, medium-voltage and high-voltage DC applications that require transmission of DC power between two electrical elements via two or more DC power transmission media.

The current flow controller and the current flow control circuit according to the invention are applicable to different DC electrical circuits having different numbers of electrical elements and DC power transmission media, and different topologies of the plurality of DC power transmission media to interconnect the electrical elements. Such a DC electrical network may be, but is not limited to, a mesh-connected DC power grid or a radial-connected DC power grid.

Preferred embodiments of the invention will now be described, by way of non-limiting examples, with reference to the accompanying drawings in which.

Figure 1:
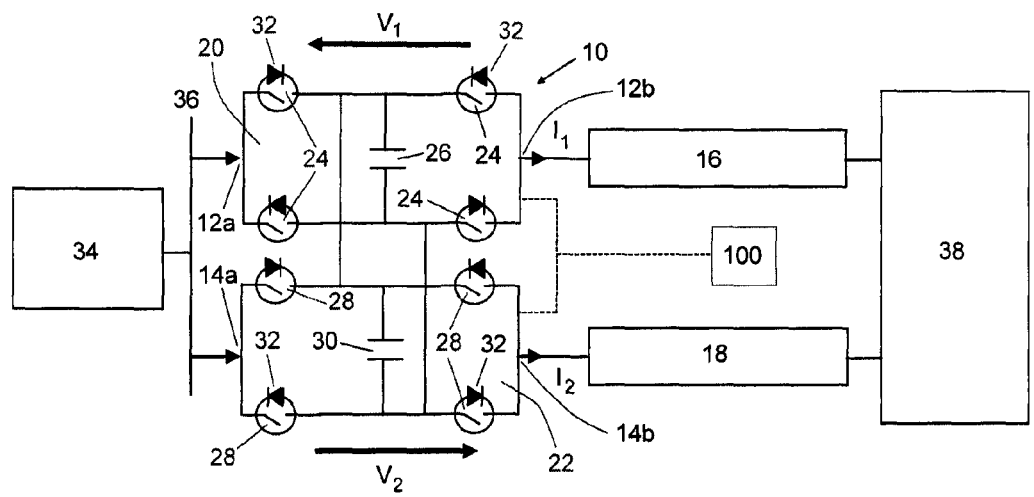
FIG. 1 shows, in schematic form, a current flow control circuit that includes a first arrangement of current flow controller.

A first arrangement of current flow controller 10 (not forming part of the invention) is shown in FIG. 1.

The current flow controller 10 comprises a plurality of terminals, and a current flow control unit.

The plurality of terminals defines a pair of first terminals 12a,12b and a pair of second terminals 14a,14b. In use, the pair of first terminals 12a,12b is connected in series with a first DC power transmission line 16, while the pair of second terminals 14a,14b is connected in series with a second DC power transmission line 18.

The current flow control unit includes first and second current flow control sub-units 20,22. The first current flow control sub-unit 20 includes a plurality of first switching elements 24 connected in parallel with a first capacitor 26 in a full-bridge arrangement, and the second current flow control sub-unit 22 includes a plurality of second switching elements 28 connected in parallel with a second capacitor 30 in a full-bridge arrangement.

Each of the first and second switching elements 24,28 is constituted by a semiconductor device in the form of an Insulated Gate Bipolar Transistor (IGBT). Each of the first and second switching elements 24,28 also includes an anti-parallel diode 32 connected in parallel therewith.

In other arrangements (not shown), it is envisaged that one or more switching elements may be or may include a different semiconductor device such as a gate turn-off thyristor, a field effect transistor, an insulated gate commutated thyristor, an injection-enhanced gate transistor, an integrated gate commutated thyristor or any other self-commutated semiconductor device connected in series or in parallel.

It is also envisaged that, in other arrangements (not shown), each capacitor may be replaced by a different energy storage device such as a fuel cell, a battery or any other energy storage device capable of storing and releasing its electrical energy to provide a voltage.

The first current flow control sub-unit 20 is connected in series between the pair of first terminals 12a,12b, while the second current flow control sub-unit 22 is connected in series between the pair of second terminals 14a,14b. Thus, in use, the first current flow control sub-unit 20 is connected in series with the first DC power transmission line 16, and the second current flow control sub-unit 22 is connected in series with the second DC power transmission line 18. The series-connection between each current flow control sub-unit 20,22 and the corresponding DC power transmission line 16,18 means that each current flow control sub-unit 20,22 may have a voltage rating that is significantly lower than the voltage difference between the corresponding DC power transmission line 16,18 and ground.

In use, the capacitor 26,30 of each current flow control sub-unit 20,22 is selectively bypassed or inserted into circuit with the corresponding DC power transmission line 16,18 by changing the state of the corresponding switching elements 24,28 of each current flow control sub-unit 20,22.

In particular, the capacitor 26,30 of each current flow control sub-unit 20,22 is bypassed when the corresponding switching elements 24,28 in each current flow control sub-unit 20,22 are configured to form a short circuit in each current flow control sub-unit 20,22. This causes the current $I_1$, $I_2$ in the corresponding DC power transmission line 16,18 to pass through the short circuit and bypass the capacitor, and so each current flow control sub-unit 20,22 injects a zero voltage drop $V_1$, $V_2$ across the corresponding pair of terminals 12a,12b,14a,14b and in series with the corresponding DC power transmission line 16,18.

In particular, the capacitor 26,30 of each current flow control sub-unit 20,22 is inserted into circuit with the corresponding DC power transmission line 16,18 when the corresponding switching elements 24,28 in each current flow control sub-unit 20,22 are configured to allow the current $I_1$, $I_2$ in the corresponding DC power transmission line 16,18 to flow into and out of the capacitor 26,30. Each capacitor 26,30 then charges or discharges its stored energy so as to provide a non-zero voltage drop $V_1$, $V_2$. Each capacitor 26,30 may be inserted into circuit in either forward or reverse directions so as to inject a positive or negative voltage drop $V_1$, $V_2$ across the corresponding pair of terminals 12a,12b,14a,14b and in series with the corresponding DC power transmission line 16,18.

In this manner, each current flow control sub-unit 20,22 is able to provide a bidirectional voltage drop across the corresponding pair of terminals 12a,12b,14a,14b and conduct current in two directions, i.e. each current flow control sub-unit 20,22 is able to operate in all four quadrants.

Thus, the configuration of the switching elements 24,28 and the capacitor 26,30 in each current flow control sub-unit 20,22 permits each current flow control sub-unit 20,22 to selectively provide a voltage source.

The first and second capacitors 26,30 are connected in parallel to electrically couple the first and second current flow control sub-units 20,22 to permit transfer of energy, in use, between the first and second current flow control sub-units 20,22.

The current flow controller 10 further includes a switching control unit 100 to control the switching of the switching elements 24,28 of the first and second current flow control sub-units 20,22.

Figure 2:
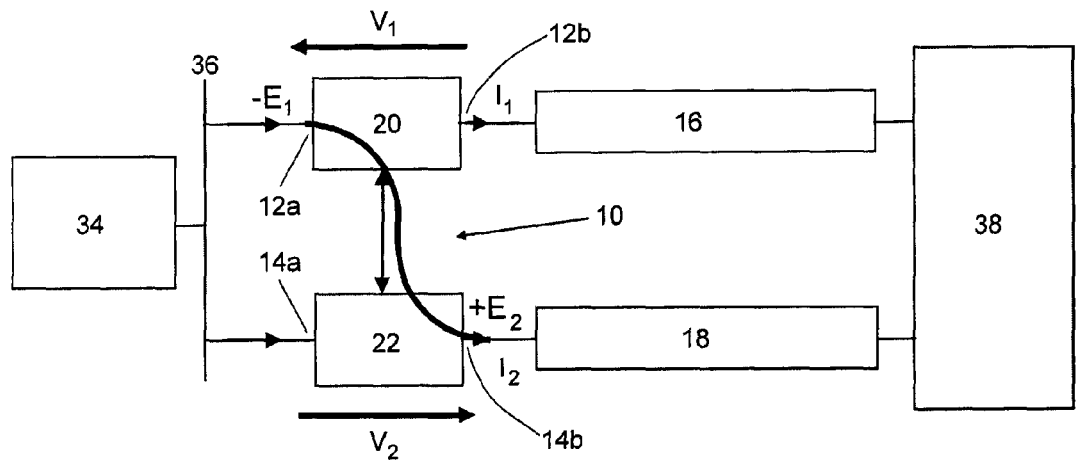
FIG. 2 illustrates the operation of the current flow controller of FIG. 1.

Operation of the current flow controller 10 of FIG. 1 is described as follows, with reference to FIG. 2.

In use, the pair of first terminals 12a,12b is connected in series with the first DC power transmission line 16 between a first DC electrical network 34, via a first DC terminal 36, and a second DC electrical network 38 while the pair of second terminals 14a,14b is connected in series with the first DC electrical network 34, via the first DC terminal 36, and the second DC electrical network 38. In this manner, the first and second DC power transmission lines 16,18 are connected in parallel between the first and second DC electrical networks 34,38. This allows the first and second DC power transmission lines 16,18 to transmit power from the first DC electrical network 34 to the second DC electrical network 38.

During transmission of power through the first and second DC power transmission lines 16,18, the current $I_1$ in the first DC power transmission line may be higher than the current $I_2$ in the second DC power transmission line. The difference in current $I_1$, $I_2$ may arise due to a variation in conductor resistance between the first and second DC power transmission lines 16,18.

To reduce the current $I_1$ in the first DC power transmission line 16, the switching control unit 100 switches the first switching elements 24 of the first current flow control sub-unit 20 to inject a first non-zero voltage drop $V_1$ in series with the first DC power transmission line 16. The direction of the first non-zero voltage drop $V_1$ is set so that the application of the first non-zero voltage drop $V_1$ in series with the first DC power transmission line 16 creates a positive resistance effect in which the first non-zero voltage drop $V_1$ opposes and thereby reduces the current $I_1$ flowing in the first DC power transmission line 16.

At the same time, to increase the current $I_2$ in the second DC power transmission line 18, the switching control unit 100 switches the second switching elements 28 of the second current flow control sub-unit 22 to inject a second non-zero voltage drop $V_2$ in series with the second DC power transmission line 18. The direction of the second non-zero voltage drop $V_2$ is set so that the application of the second non-zero voltage drop $V_2$ in series with the second DC power transmission line 18 creates a negative resistance effect in which the second non-zero voltage drop $V_2$ contributes to an increase of the current $I_2$ flowing in the second DC power transmission line 18.

Meanwhile, the application of the first and second non-zero voltage drops $V_1$, $V_2$ together with the electrical coupling between the first and second current flow control sub-units 20,22 allows energy to be transferred between the DC power transmission lines 16,18 via the current flow control unit. In this manner, energy $E_1$ is removed from the first DC power transmission line 16 that is undergoing a reduction in current $I_1$ and this energy $E_1$ is added to the second DC power transmission line 18 that is undergoing an increase in current $I_2$ by way of energy diversion through the current flow control unit. The energy $E_1$ diverted by the current flow control unit from the first DC power transmission line 16 is preferably equal to the energy $E_2$ diverted by the current flow control unit into the second DC power transmission line 18 so as to minimise dissipation losses during the diversion of energy by the current flow control unit.

Figure 3:
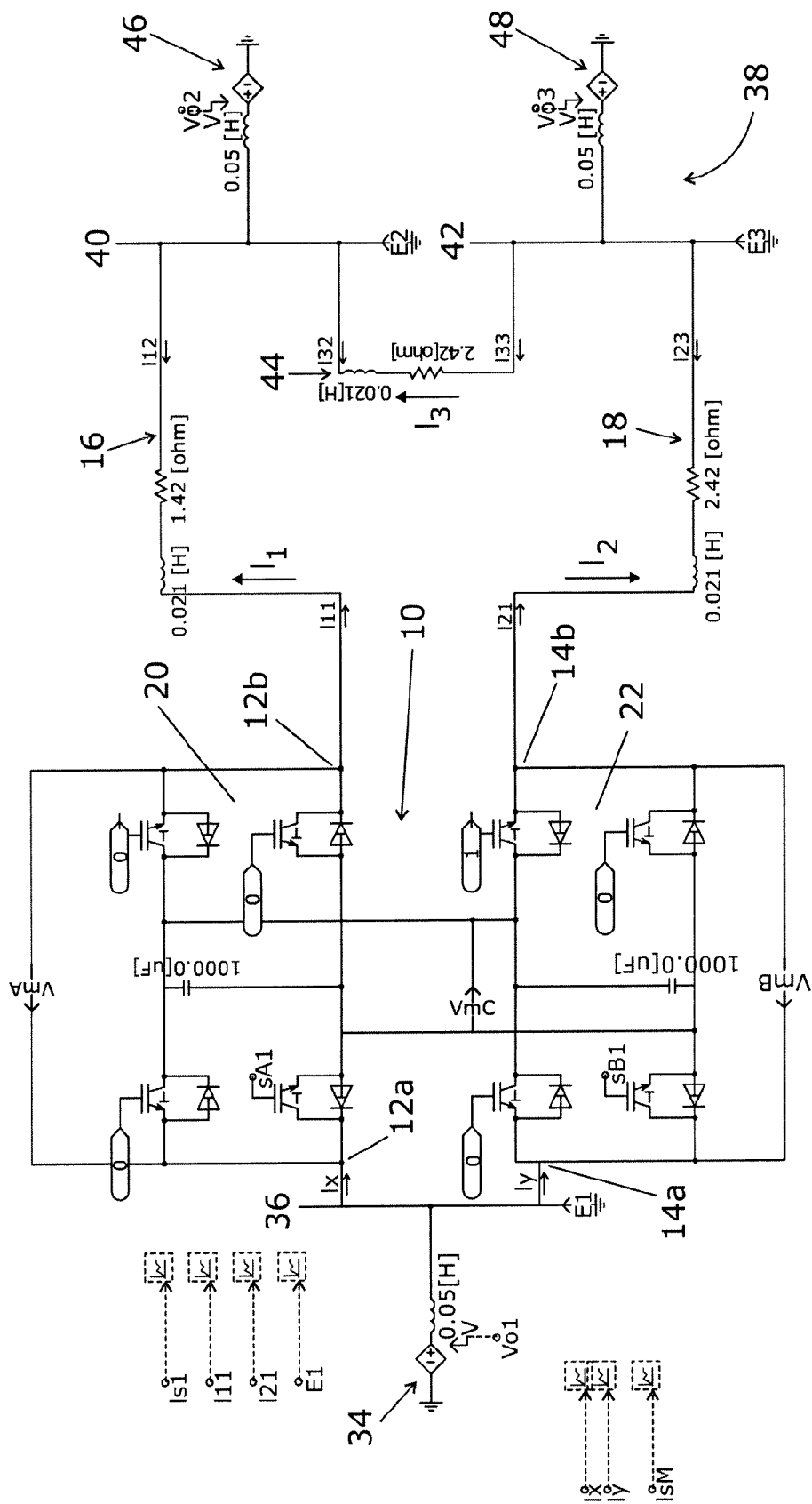
FIG. 3 shows, in schematic form, an exemplary EMTDC/PSCAD model of the current flow control circuit of FIG. 1 for simulation of the operation of the current flow controller as illustrated in FIG. 2.

By way of an example, FIG. 3 shows a EMTDC/PSCAD model of the current flow control circuit of FIG. 1 for simulation of the operation of the current flow controller 10. The model of FIG. 3 is similar in terms of structure and operation to the current flow control circuit shown in FIG. 1 and like features share the same reference numerals.

The model of FIG. 3 further includes the following features:
- the first DC electrical network 34 is a first DC converter;
- the second DC electrical network 38 includes second and third DC terminals 40,42 that are interconnected by a third DC power transmission line 44;
- the second and third DC terminals 40,42 are respectively connected to second and third DC converters 46,48; and
- the voltages of the DC converters 34,46,48 are selected to produce a rated current of 1.0 pu at the first DC converter 34 and a rated current of 0.5 pu at the second and third DC converters 46,48.

The resistance of the first DC power transmission line 16 was then reduced to create a current imbalance between the first and second DC power transmission lines 16,18, whereby the currents in the first and second DC power transmission lines 16,18 are 0.628 pu A and 0.372 pu respectively.

Figure 4:
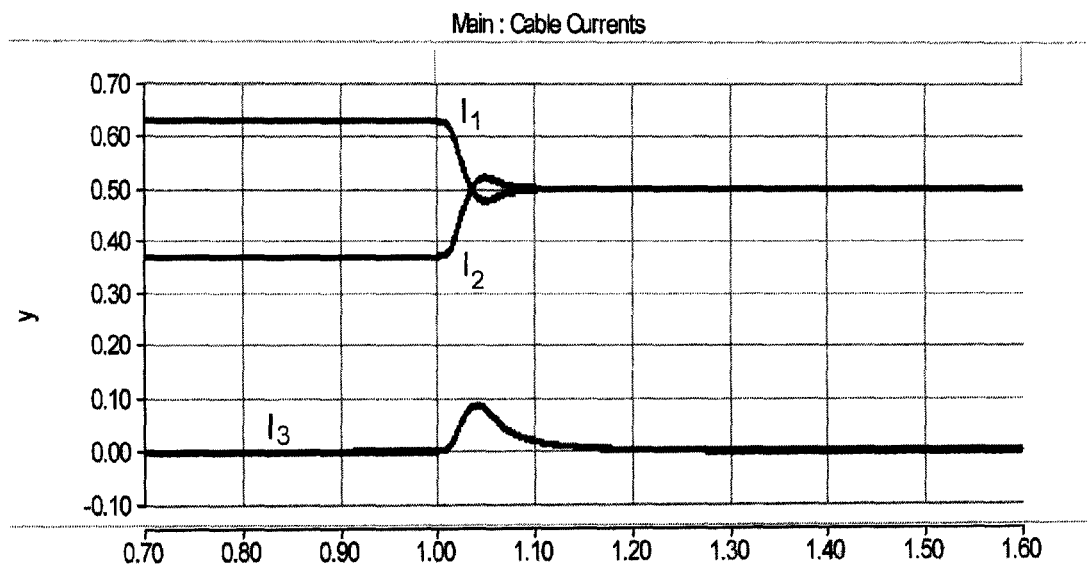
FIG. 4 illustrates the simulation results for the EMTDC/PSCAD model of FIG. 3.

FIG. 4 shows the simulation results for the EMTDC/PSCAD model of FIG. 3. At t=0, the current flow controller 10 was disabled. At t=1 second, the current flow controller 10 was enabled to regulate the currents $I_1$, $I_2$ in the first and second DC power transmission lines 16,18. As described above with reference to FIG. 2, the operation of the current flow controller 10 resulted in diversion of energy from the first DC power transmission line 16 to the second DC power transmission line 18, resulting in equalisation of the currents $I_1$, $I_2$ in both DC power transmission lines 16,18 to a current level of 0.5 pu. Meanwhile the current $I_3$ in the third DC power transmission line 44 remained at 0.0 pu, with the exception of an initial transient rise in current when the current flow controller 10 was enabled.

It will be appreciated that the regulation of current flows $I_1$, $I_2$ in the DC power transmission lines 16,18 does not always involve balancing of the current flows $I_1$, $I_2$ in the DC power transmission lines 16,18. For example, the current flow controller 10 may be controlled to reduce the current $I_1$ in the first DC power transmission line 16 to a higher or lower value than the current $I_2$ in the second DC power transmission line 18, instead of equalising the currents $I_1$, $I_2$ in both DC power transmission lines 16,18 to the same current level.

The current flow controller 10 may be operated continuously or intermittently to regulate the current flows $I_1$, $I_2$ in the DC power transmission lines 16,18. Intermittent operation of the current flow controller 10 involves periodically bypassing both capacitors 26,30 of the first and second current flow control sub-units 20,22 to inject a zero voltage drop $V_1$, $V_2$ across the corresponding pair of terminals 12a,12b,14a,14b whenever current flow regulation is not required in the corresponding DC power transmission line 16,18.

The operation of the current flow controller 10 in this manner therefore enables regulation of the current flows $I_1$, $I_2$ in the DC power transmission lines 16,18, and thereby permits dynamic, selective control over the current flow $I_1$, $I_2$ in each DC power transmission line 16,18. Such control over the current flow $I_1$, $I_2$ in each DC power transmission line 16,18 is advantageous in that the current flow $I_1$, $I_2$ in each DC power transmission line 16,18 may be controlled within a specific operating range to improve the power transmission performance of the DC power transmission lines 16,18.

The current flow controller 10 may be used to regulate the current flows $I_1$, $I_2$ in the DC power transmission lines 16,18 in order to minimise dissipation losses and to reduce the risk of each DC power transmission line 16,18 exceeding its thermal rating.

The ability of each current flow control sub-unit 20,22 to inject a bidirectional voltage in series with the corresponding DC power transmission line 16,18 results in a flexible current flow controller 10 that is capable of also addressing a current imbalance between the first and second DC power transmission lines 16,18 in the opposite direction, in which the second DC power transmission line 18 carries a higher current than the first DC power transmission line 16.

The ability of each current flow control sub-unit 20,22 to conduct current in two directions renders the current flow controller 10 compatible for use in circumstances in which the direction of the current flow between the first and second DC electrical networks 34,38 is reversed.

In addition, the use of the current flow controller 10 results in an energy-efficient manner of regulating current flow $I_1$, $I_2$ in the DC power transmission lines 16,18. This is because the diversion of energy during the regulation of the current flow $I_1$, $I_2$ in each DC power transmission line 16,18 involves transferring energy $E_1$ that is removed from one DC power transmission line 16 to another DC power transmission line 18. This thereby obviates the need for additional energy sources to add energy into a DC power transmission line 16,18 and the need for additional energy sinks such as storage capacitors or dissipation resistors to store or dissipate energy that is removed from a DC power transmission line 16,18, when increasing or decreasing current flow $I_1$, $I_2$ in each DC power transmission line 16,18. The use of additional energy sources and sinks would add significant cost, size and weight to the current flow controller 10. Moreover, the use of dissipation resistors would not only increase dissipation losses in the DC power transmission lines 16,18, but also might require the use of a cooling system, which would increase the overall complexity of the current flow controller 10.

Furthermore, the use of the current flow controller 10 in regulating the current flow $I_1$, $I_2$ in each DC power transmission line 16,18 is carried out independently of the operation of the DC electrical networks 34,36 at either end of each DC power transmission line $I_1$, $I_2$. This removes the need to redesign the control procedure for the DC electrical networks 34,36 in order to accommodate a need for regulation of the current flow $I_1$, $I_2$ in each DC power transmission line 16,18.

The switching control unit 100 may switch each switching element 24,28 to selectively define an electrical filtering circuit to perform electrical filtering, in use, on the current flow $I_1$, $I_2$ in each DC power transmission line 16,18

Having the ability to perform electrical filtering on the current flow $I_1$, $I_2$ in each DC power transmission line 16,18 permits the removal of unwanted components from the current $I_1$, $I_2$ in each DC power transmission line 16,18. Such unwanted components may include, but is not limited to, DC harmonics that arises during operation of the current flow controller 10 to regulate current flow $I_1$, $I_2$ in the plurality of DC power transmission lines 16,18.

It is envisaged that, in other arrangements, the current flow control unit may further include an electrical filter circuit to selectively perform electrical filtering, in use, on the current flow $I_1$, $I_2$ in each DC power transmission line 16,18. Such a electrical filter circuit may include, but is not limited to, one or more series inductors, one or more shunt capacitors, a plurality of series capacitors and series inductors, and/or one or more resistive elements. The electrical filter circuit may be tuned to one or more harmonic frequencies that is to be minimised.

Figure 5:
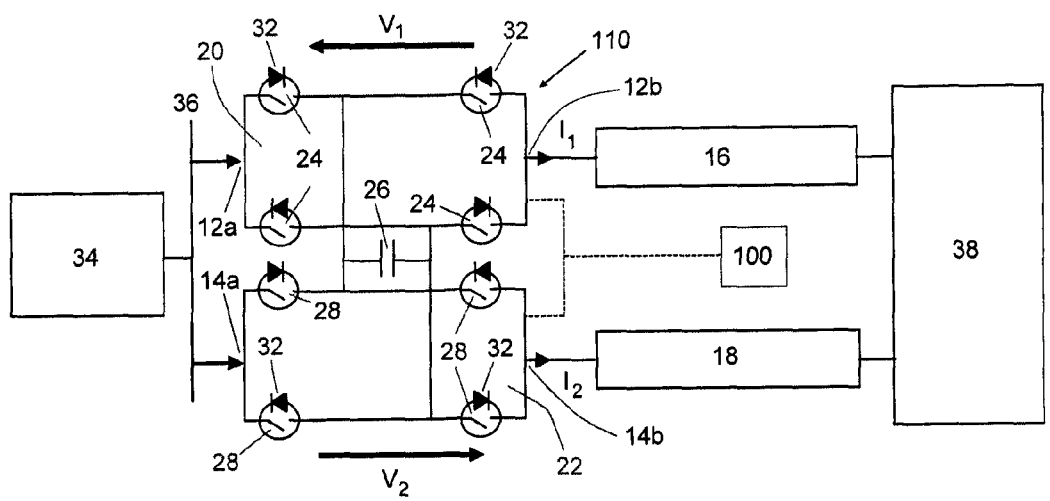
FIG. 5 shows, in schematic form, a current flow control circuit that includes a current flow controller according to a first embodiment of the invention.

A current flow controller 110 according to a first embodiment of the invention is shown in FIG. 5. The first embodiment of the current flow controller 110 in FIG. 5 is similar in structure and operation to the aforementioned current flow controller 10 shown in FIG. 1, and like features share the same reference numerals.

The first current flow controller 110 differs from the aforementioned current flow controller 10 in that, in the first current flow controller 110:
the first current flow control sub-unit 20 includes a plurality of first switching elements 24 connected in parallel with a first capacitor 26 in a full-bridge arrangement; and
the second current flow control sub-unit 22 includes a plurality of second switching elements 28 connected in parallel with the same first capacitor 26 in a full-bridge arrangement.

Thus, the first and second current flow control sub-units 20,22 share the same first capacitor 26.

In use, the first capacitor 26 is selectively bypassed or inserted into circuit with the respective DC power transmission line 16,18 by changing the state of the corresponding switching elements 24,28 of each current flow control sub-unit 20,22.

The first capacitor 26 of the first current flow controller 110 is bypassed in a similar manner as the capacitor 26,30 of each current flow control sub-unit 20,22 of the aforementioned current flow controller 10, as described above.

The first capacitor 26 is inserted into circuit with the respective DC power transmission line 16,18 when the switching elements 24,28 in each current flow control sub-unit 20,22 are configured to allow the current $I_1$, $I_2$ in the corresponding DC power transmission line 16,18 to flow into and out of the first capacitor 26. The first capacitor 26 then charges or discharges its stored energy so as to provide a non-zero voltage drop $V_1$, $V_2$. The first capacitor 26 may be inserted into circuit with the respective DC power transmission line 16,18 in either forward or reverse directions so as to inject a positive or negative voltage drop $V_1$, $V_2$ across the corresponding pair of terminals 12a,12b,14a,14b and in series with the respective DC power transmission line 16,18.

Sharing the same first capacitor 26 results in the first and second current flow control sub-units 20,22 being electrically coupled and thereby allows energy to be transferred between the first and second current flow control sub-units 20,22.

Figure 6:
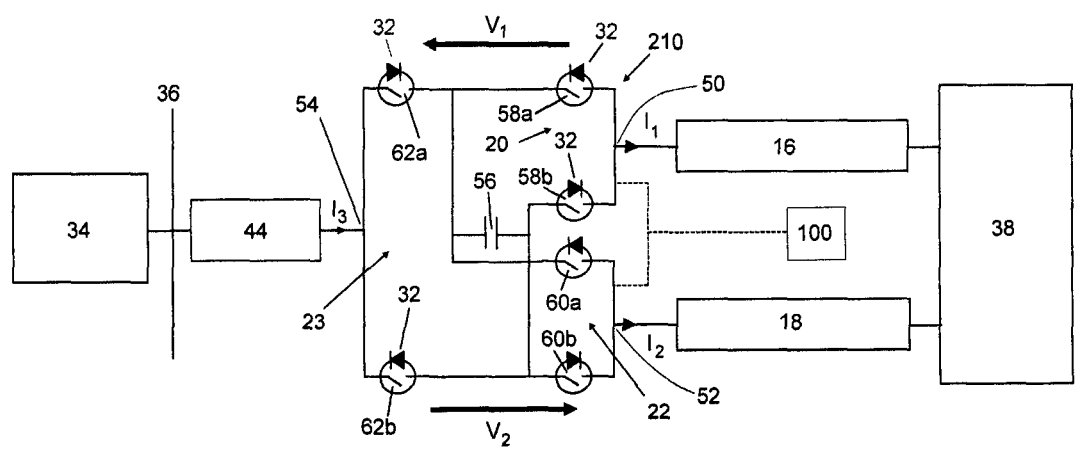
FIG. 6 shows, in schematic form, a current flow control circuit that includes a current flow controller according to a second embodiment of the invention.

A current flow controller 210 according to a second embodiment of the invention is shown in FIG. 6. The second embodiment of the current flow controller 210 in FIG. 6 is similar in structure and operation to the first embodiment of the current flow controller 110 in FIG. 5, and like features share the same reference numerals.

The second current flow controller 210 differs from the first current flow controller 110 in that, in the second current flow controller 210:

the current flow control unit further includes first, second and third ports 50, 52, 54;
the first port 50 defines a first terminal for connection, in use, to the first DC power transmission line 16;
the second port 52 defines a second terminal for connection, in use, to the second DC power transmission line 18;
the third port 54 defines a third terminal for connection, in use, to a third DC power transmission line 44. In use, the third DC power transmission line 44 is connected between the third port 54 and the DC terminal 36;
the current flow control unit includes an energy storage device in the form of a capacitor 56, a first current flow control sub-unit 20 including a pair of first switching elements 58a,58b, a second current flow control sub-unit 22 including a pair of second switching elements 60a,60b and a third current flow control sub-unit 23 including a pair of third switching elements 62a,62b;
the pair of first switching elements 58a,58b is connected across the capacitor 56. A mid-point between the pair of first switching elements 58a,58b is connected to the first port 50;
the pair of second switching elements 60a,60b is connected across the capacitor 56. A mid-point between the pair of second switching elements 60a,60b is connected to the second port 52;
the pair of third switching elements 62a,62b is connected across the capacitor 56. A mid-point between the pair of third switching elements 62a,62b is connected to the third port 54.

Each switching element 58a,58b,60a,60b,62a,62b is constituted by a semiconductor device in the form of an IGBT. Each switching element 58a,58b,60a,60b,62a,62b also includes an anti-parallel diode 32 connected in parallel therewith.

The configuration of the current flow control unit in this manner results in the formation of a tri-port current flow controller 210.

In use, the capacitor 56 is selectively bypassed or inserted into circuit with the respective DC power transmission line 16,18,44 by changing the state of the corresponding switching elements 58a,58b,60a,60b,62a,62b.

The capacitor 56 of the second current flow controller 210 is bypassed in a similar manner as the first capacitor 26 of the first current flow controller 110, as described above.

The capacitor 56 is inserted into circuit with the respective DC power transmission line 16,18,44 when the switching elements 58a,58b,60a,60b,62a,62b are configured to allow the current $I_1$, $I_2$, $I_3$ in the corresponding DC power transmission line 16,18,44 to flow into and out of the capacitor 56. The capacitor 56 then charges or discharges its stored energy so as to inject a non-zero voltage drop $V_1$, $V_2$ in circuit with the respective DC power transmission line 16,18,44.

The switching control unit 100 controls the switching of the switching elements 58a,58b,60a,60b,62a,62b of the current flow control unit.

The configuration of the tri-port current flow controller 210 therefore permits energy to be transferred between the first, second and third DC power transmission lines 16,18,44 via the current flow control unit during regulation of the current flows $I_1$, $I_2$, $I_3$ in the DC power transmission lines 16,18,44.

It is envisaged that, in other embodiments of the invention, the modular topology and number of components of the current flow control unit of the tri-port current flow controller 210 may be extended to accommodate one or more additional ports, e.g. a fourth port, a fifth port, etc, to define a multi-port current flow controller. For example, the current flow control unit may be extended to include an additional port defining an additional terminal for connection, in use, to an additional DC power transmission line, and the current flow control unit may further include a pair of additional switching elements connected across the capacitor 56, whereby a mid-point between the pair of additional switching elements is connected to the additional port. The number of ports in such a current flow control unit may vary depending on the number of associated DC power transmission lines and the topology of the associated DC electrical circuit.

In the current flow control circuits shown in FIGS. 1 to 3, 5 and 6, the DC power transmission lines 16,18,44 have a single mono-pole configuration with a return conductor at ground potential. Such current flow controllers 10,100,210 may also be used in conjunction with DC power transmission lines having a symmetrical mono-pole or bipolar configuration.

The current flow controller 110,210 and the current flow control circuit according to the invention are applicable to different DC electrical circuits having different numbers of electrical elements and DC power transmission lines, and different topologies of the plurality of DC power transmission lines to interconnect the electrical elements. Such a DC electrical network may be, but is not limited to, a mesh-connected DC power grid or a radial-connected DC power grid.

In such DC electrical circuits, depending on the topology and/or current flow regulation requirements of the DC power transmission lines, the current flow control unit may be used to divert energy from a single DC power transmission line to a single other DC power transmission line, from a single DC power transmission line to multiple other DC power transmission lines, from multiple DC power transmission lines to a single other DC power transmission lines, or from multiple DC power transmission lines to multiple other DC power transmission lines.

It is envisaged that, in other embodiments, each DC power transmission line may be replaced by, but is not limited to, a submarine DC power transmission cable, an overhead DC power transmission cable, an underground DC power transmission cable, or any DC power transmission medium of transmitting electrical power between two or more electrical elements.

The invention claimed is:
1. A current flow controller comprising:
a first current flow control sub-unit electrically connected to a first DC electrical network via a first input terminal, the first current flow control sub-unit comprising a first plurality of switches and a first energy storage device;

a second current flow control sub-unit electrically connected to the first DC electrical network via a second input terminal, the second current flow control sub-unit comprising a second plurality of switches and a second energy storage device, the second energy storage device electrically connected in parallel to the first energy storage device;

a first DC power transmission medium electrically connected in series to the first current flow control sub-unit via a first output terminal, the first DC power transmission medium further electrically coupled to a second DC electrical network;

a second DC power transmission medium electrically connected in series to the second current flow control sub-unit via a second output terminal, the second DC power transmission medium further electrically coupled to the second DC electrical network;

a switching control unit electrically connected to the first current flow control sub-unit, and electrically connected to the second current flow control sub-unit, the switching control unit controls a state of each of the first plurality of switches and each of the second plurality of switches to:

establish a first current flow away from the first DC power transmission medium by injecting a first non-zero voltage drop in series with the first DC power transmission medium; and establish a second current flow toward the second DC power transmission medium by injecting a second non-zero voltage drop in series with the second DC power transmission medium;

thereby allowing energy to be transferred from the first DC power transmission medium to the second DC power transmission medium.

2. A current flow controller according to claim 1 wherein the switching control unit controls the state of each of the first plurality of switches and each of the second plurality of switches such that currents in the first DC power transmission medium and the second DC power transmission medium are balanced.

3. A current flow controller according to claim 1 wherein at least one of the first non-zero voltage drop and the second non-zero voltage drop is variable.

4. A current flow controller according to claim 1 wherein at least one of the first non-zero voltage drop and the second non-zero voltage drop is a positive or negative DC voltage drop.

5. A current flow controller according to claim 1 wherein at least one of the first current flow control sub-unit and the second current flow control sub-unit conducts current in two directions.

6. A current flow controller according to claim 1 wherein at least one of the first plurality of switched and the second plurality of switches are connected in series.

7. A current flow controller according to claim 1 wherein at least one of the first current flow control sub-unit and the second current flow control sub-unit includes a plurality of switching elements connected in parallel with an energy storage device in a full-bridge arrangement.

8. A current flow controller according to claim 7 wherein the first current flow control sub-unit includes a plurality of first switching elements connected in parallel with the energy storage device in a full-bridge arrangement, and the second current flow control sub-unit includes a plurality of second switching elements connected in parallel with the same energy storage device in a full-bridge arrangement.

9. A current flow control circuit comprising:
a first DC power transmission medium and a second DC power transmission medium for interconnecting a plurality of electrical elements; and a current flow controller comprising:
a first current flow control sub-unit electrically connected to a first DC electrical network via a first input terminal, the first current flow control sub-unit comprising a first plurality of switches and a first energy storage device; wherein the first DC power transmission medium is electrically connected to the first current flow control sub-unit via a first output terminal;

a second current flow control sub-unit electrically connected to the first DC electrical network via a second input terminal, the second current flow control sub-unit comprising a second plurality of switches and a second energy storage device, the second energy storage device electrically connected in parallel to the first energy storage device; wherein the second DC power transmission medium is electrically connected to the second current flow control sub-unit via a second output terminal;

a switching control unit electrically connected to the first current flow control sub-unit, and electrically connected to the second current flow control sub-unit, the switching control unit controls a state of each of the first plurality of switches and each of the second plurality of switches to:

establish a first current flow away from the first DC power transmission medium by injecting a first non-zero voltage drop in series with the first DC power transmission medium; and establish a second current flow toward the second DC power transmission medium by injecting a second non-zero voltage drop in series with the second DC power transmission medium;

thereby allowing energy to be transferred from the first DC power transmission medium to the second DC power transmission medium.

10. A current flow control circuit according to claim 9 wherein the switching control unit controls the state of each of the first plurality of switches and each of the second plurality of switches such that currents in the first DC power transmission medium and the second DC power transmission medium are balanced.

11. A current flow control circuit according to claim 9 wherein at least one of the first current flow control sub-unit and the second current flow control sub-unit conducts current in two directions.

12. A current flow control circuit according to claim 9 wherein at least one of the first plurality of switched and the second plurality of switches are connected in series.

13. A current flow control circuit according to claim 9 wherein at least one of the first current flow control sub-unit and the second current flow control sub-unit includes a plurality of switching elements connected in parallel with an energy storage device in a full-bridge arrangement.

14. A current flow control circuit according to claim 13 wherein the first current flow control sub-unit includes a plurality of first switching elements connected in parallel with the energy storage device in a full-bridge arrangement, and the second current flow control sub-unit includes a plurality of second switching elements connected in parallel with the same energy storage device in a full-bridge arrangement.

* * * * *